(12) United States Patent
Todd et al.

(10) Patent No.: US 6,195,967 B1
(45) Date of Patent: Mar. 6, 2001

(54) PACKAGING MACHINE HAVING CONTINUOUS AND INTERMITTENT MODES

(75) Inventors: James E. Todd; Thomas E. Brooker; Gregory A. Conn, all of Sarasota, FL (US)

(73) Assignee: Klockner Bartelt, Inc., Sarasota, FL (US)

( * ) Notice: Subject to any disclaimer, the term of this patent is extended or adjusted under 35 U.S.C. 154(b) by 0 days.

(21) Appl. No.: 09/185,355

(22) Filed: Nov. 3, 1998

(51) Int. Cl.[7] .............. B65B 43/02; B65B 51/10; B65B 61/00; B65B 57/00; B65B 57/02

(52) U.S. Cl. .................. 53/562; 53/51; 53/64; 53/139.2; 53/329.2

(58) Field of Search .......... 53/562, 568, 329.2, 53/51, 64, 139.2

(56) References Cited

U.S. PATENT DOCUMENTS

| | | | |
|---|---|---|---|
| 2,951,325 | * 9/1960 | Podlesak et al. | 53/550 |
| 3,553,934 | * 1/1971 | Johnson et al. | 53/562 |
| 3,975,888 | 8/1976 | Jones | 53/386 |
| 4,436,576 | 3/1984 | Seiden | 156/543 |
| 4,548,018 | 10/1985 | Wojnicki | 53/51 |
| 4,580,473 | 4/1986 | Seiden et al. | 83/23 |
| 4,617,785 | * 10/1986 | Chikatani et al. | 53/562 |
| 4,726,168 | * 2/1988 | Seko | 53/64 |
| 4,849,040 | 7/1989 | Wood | 156/204 |
| 4,999,968 | 3/1991 | Davis | 53/133.1 |
| 5,058,364 | 10/1991 | Seiden et al. | 53/455 |
| 5,080,747 | * 1/1992 | Veix | 53/562 |
| 5,094,657 | 3/1992 | Dworak et al. | 493/208 |
| 5,181,365 | 1/1993 | Garvey et al. | 53/455 |
| 5,187,917 | 2/1993 | Mykleby | 53/434 |
| 5,222,422 | 6/1993 | Benner, Jr. et al. | 83/37 |
| 5,315,807 | 5/1994 | Restle et al. | 53/51 |
| 5,353,573 | 10/1994 | Durrant | 53/410 |
| 5,359,832 | * 11/1994 | Hartman et al. | 53/562 |
| 5,505,037 | * 4/1996 | Terminella et al. | 53/139.2 |
| 5,699,653 | 12/1997 | Hartman et al. | 53/455 |
| 5,722,217 | 3/1998 | Cloud | 53/455 |
| 5,862,653 | * 1/1999 | Solano | 53/562 |
| 6,050,061 | * 4/2000 | Todd et al. | 53/562 |

FOREIGN PATENT DOCUMENTS

| | | |
|---|---|---|
| 2142480 | 8/1995 | (CA) . |
| 898106992 | 4/1990 | (EP) . |
| 89123703 | 7/1990 | (EP) . |

\* cited by examiner

Primary Examiner—Brian L. Johnson
Assistant Examiner—Matthew Luby
(74) Attorney, Agent, or Firm—Leydig, Voit & Mayer, Ltd

(57) ABSTRACT

A packaging machine capable of forming pouches from both continuously and intermittently advancing webs. The machine has a pair of drive rolls adapted to advance the web that are operable both continuously and intermittently. Web-engaging components of the machine are operable to engage the web and perform their associated functions as the web is in motion. The web-engaging components are further selectively operable to have an adjustable dwell period between operations, thereby allowing the machine to be switched between continuous and intermittent modes, and to adapt the machine to form pouches of various sizes. The formed pouches are transferred to a pouch filling section which is also operable to receive and advance individual pouches either continuously or intermittently.

16 Claims, 6 Drawing Sheets

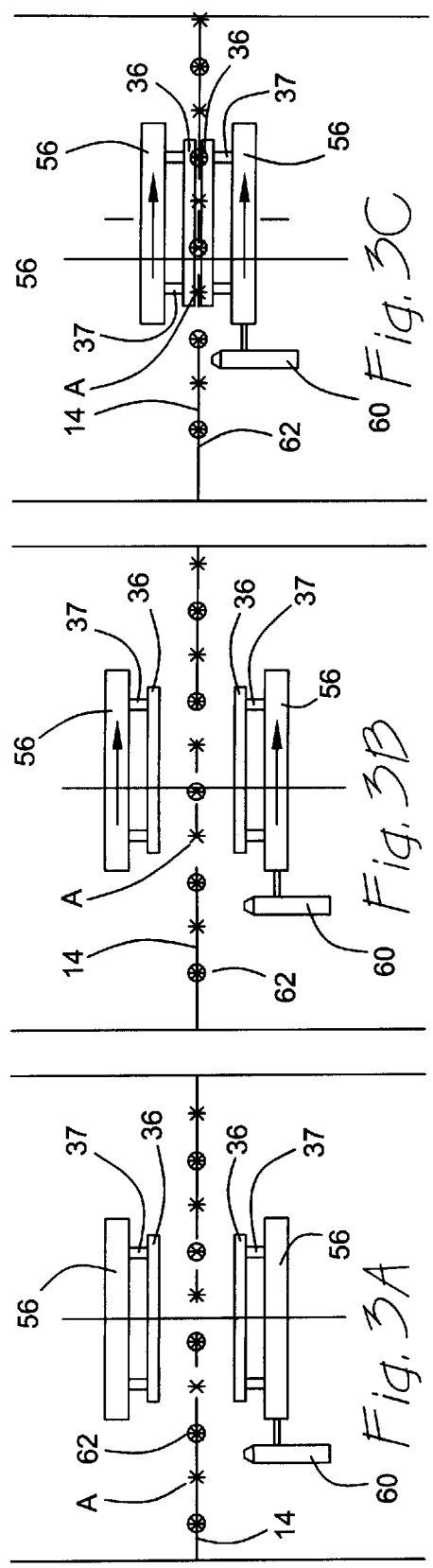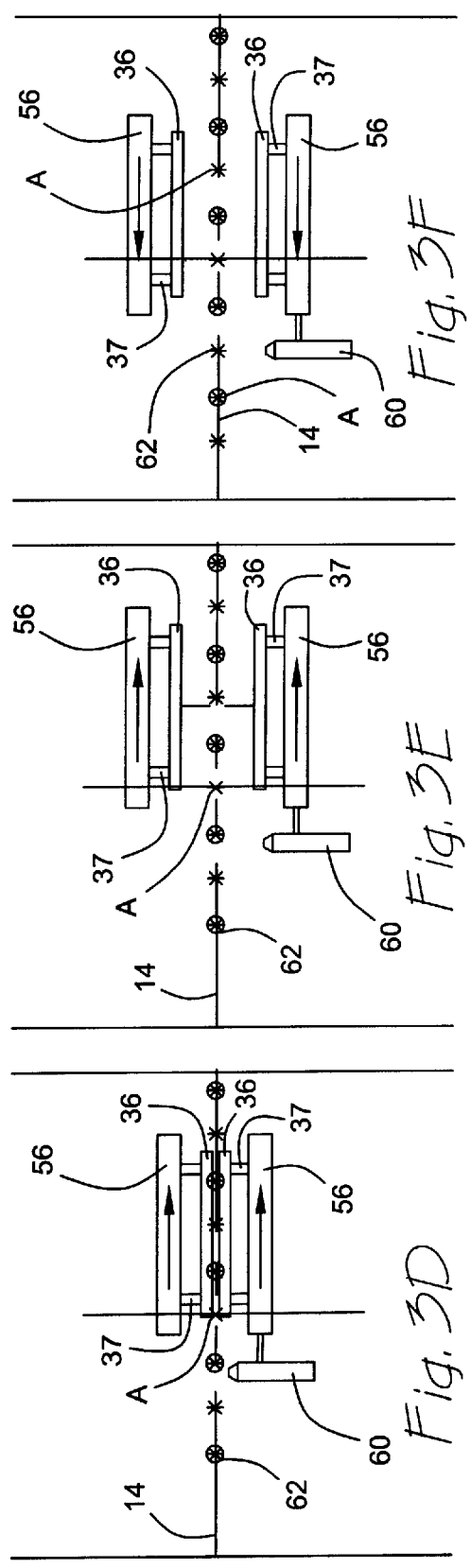

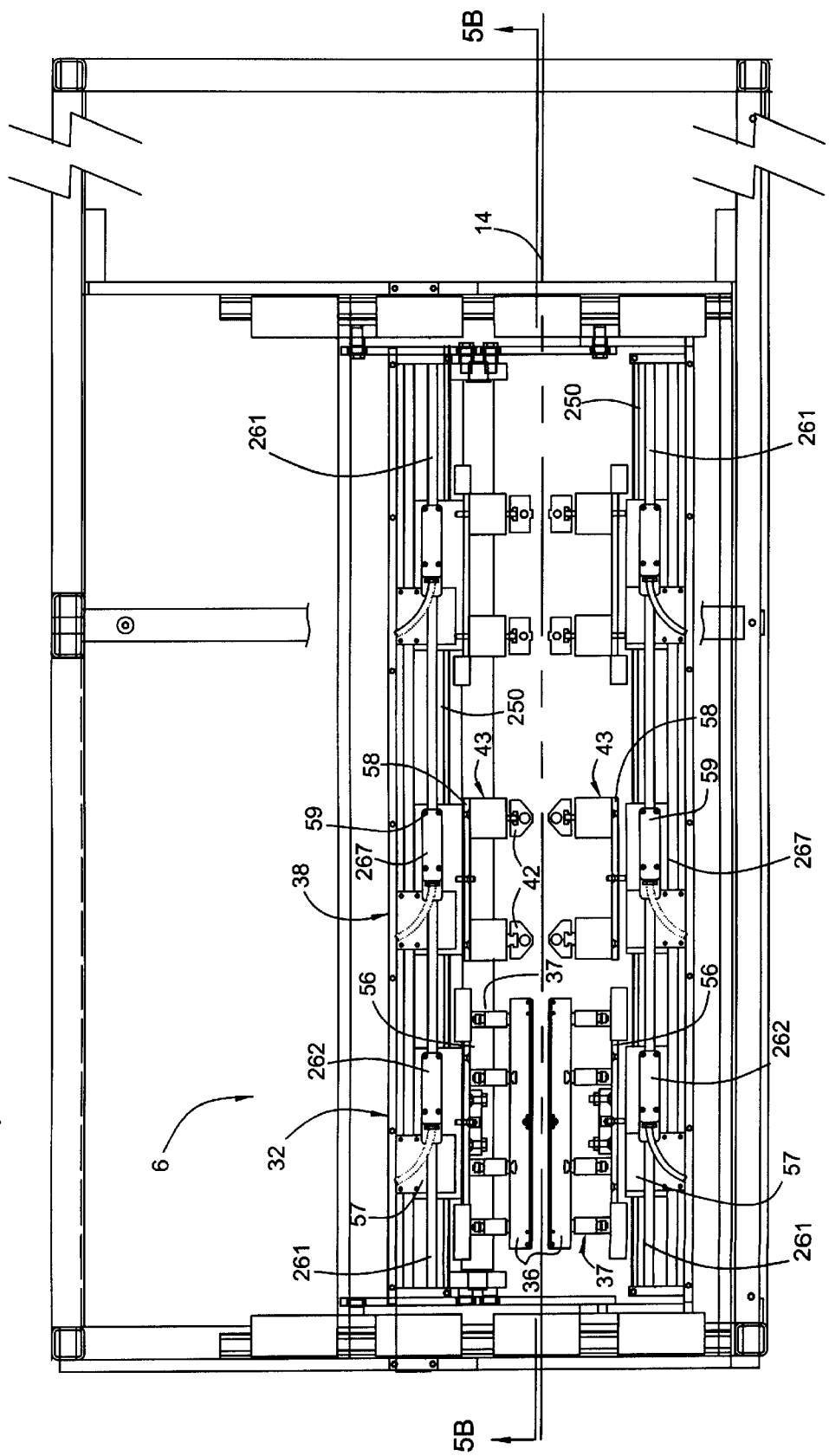

PACKAGING MACHINE HAVING CONTINUOUS AND INTERMITTENT MODES

FIELD OF THE INVENTION

The present invention relates to packaging machines, and more particularly relates to horizontal form, fill, and seal packaging machines.

BACKGROUND OF THE INVENTION

Packaging machines are generally known in which a continuous web of material is converted into a plurality of individual pouches. The continuous web of material is folded in half over a plow to form two continuous side panels joined by a bottom fold. The folded web is passed through a series of seal bars which form transverse seals between the side panels, thereby forming a strip of pouches interconnected by transverse seals. A cutter cuts through each transverse seal to form individual pouches with unsealed top edges. The individual pouches are transferred to a pouch filler, filled with product, and sealed. The sealed pouches are then collected for transport. Machines of this type may be categorized as either horizontal or vertical machines, depending on the general direction of web travel. The present invention relates to horizontal packaging machines in which the web travels horizontally.

The type and volume of product being packaged often determines whether the packaging process should use a continuously or intermittently advancing web. Certain products, such as hard candy, require a fill based on weight instead of volume. Scale fillers require relatively long periods to fill a pouch. As a result, slower cycle continuous motion or intermittent motion is required to provide additional fill time. In addition, larger volume fills require more time, and therefore intermittent motion through the filler may be necessary. More free flowing products, such as sugar, may be dispensed using a diving funnel suitable for filling continuously advancing pouches.

In light of the above, packaging machines have been developed specifically for either intermittent or continuous operation. Continuous motion machines typically require web-engaging components which are moveable and can be phased with the advancing web. For example, U.S. Pat. No. 5,722,217 to Cloud discloses a packaging machine for use with a continuously advancing web. The '217 device uses a sealing drum to form the vertical seals of the pouches. Sealing wires are circumferentially spaced about the sealing drum to provide sealing points. The web is entrained about the drum and the drum is rotated so that seals are formed as the web continuously advances. The '217 device further fills the pouches while they are still connected and therefore the web must be continuously advanced through the pouch filler section as well. It is not seen, however, that the '217 device is operable with an intermittently advancing web since it would be difficult to control the sealing drum so that it starts and stops at the appropriate times.

Most conventional intermittent motion machines, on the other hand, have web-engaging components which are stationary and perform operations during dwell periods between incremental advances. For example, U.S. Pat. No. 5,181,365 to Garvey, et al. discloses a packaging machine for use with an intermittently advancing web. The '365 device has sealers and a cutter spaced longitudinally along the web path at fixed locations. These components perform their associated operations during web dwells. Accordingly, machines such as that disclosed in the '365 patent are not suitable for use with a continuously advancing web since the stationary components would stretch or tear the web during operation.

Changing a machine over from continuous to intermittent web motion, or vice versa, is further limited by the conventional mechanical line shafting used in such machines. Most previous packaging machines use a drive line with an array of gearboxes and/or cams to operate the various components. To switch between continuous and intermittent operation would require substantial modifications to the drive line to enable it to run in the other mode.

SUMMARY OF THE INVENTION

A general aim of the present invention is to provide a packaging machine operable with both intermittently and continuously advancing web.

A related object of the present invention is to provide a packaging machine which is quickly and easily switched between continuous and intermittent modes.

In light of the above, the present invention provides a packaging machine in which the components are independently motor controlled. A pair of drive rolls pull the web through the machine and are operable to advance the web either continuously or intermittently. The machine further comprises at least one seal mechanism adapted to form seals in the web as it advances. The seal mechanism is selectively operable to adjust a dwell time between seal operations. The machine also has a cutter adapted to cut the formed seals as the web advances, the cutter also being selectively operable. As a result, the machine is adapted to pouches of various sizes and may be switched between continuous and intermittent modes. Severed pouches are transferred to a pouch filling section which is adapted for both continuous and intermittent operation.

In a preferred embodiment, the present invention provides a motor-controlled reel for dispensing the web of material. The speed of the reel motor may be adjusted to meet downstream demand, thereby minimizing the size of a festoon for storing a buffer length of material.

These and other aims, objectives, and features of the invention will become more apparent from the following detailed description when taken in conjunction with the accompanying drawings.

BRIEF DESCRIPTION OF THE DRAWINGS

FIGS. 3A–F are schematic top views of a seal station in operation.

Figure 1:
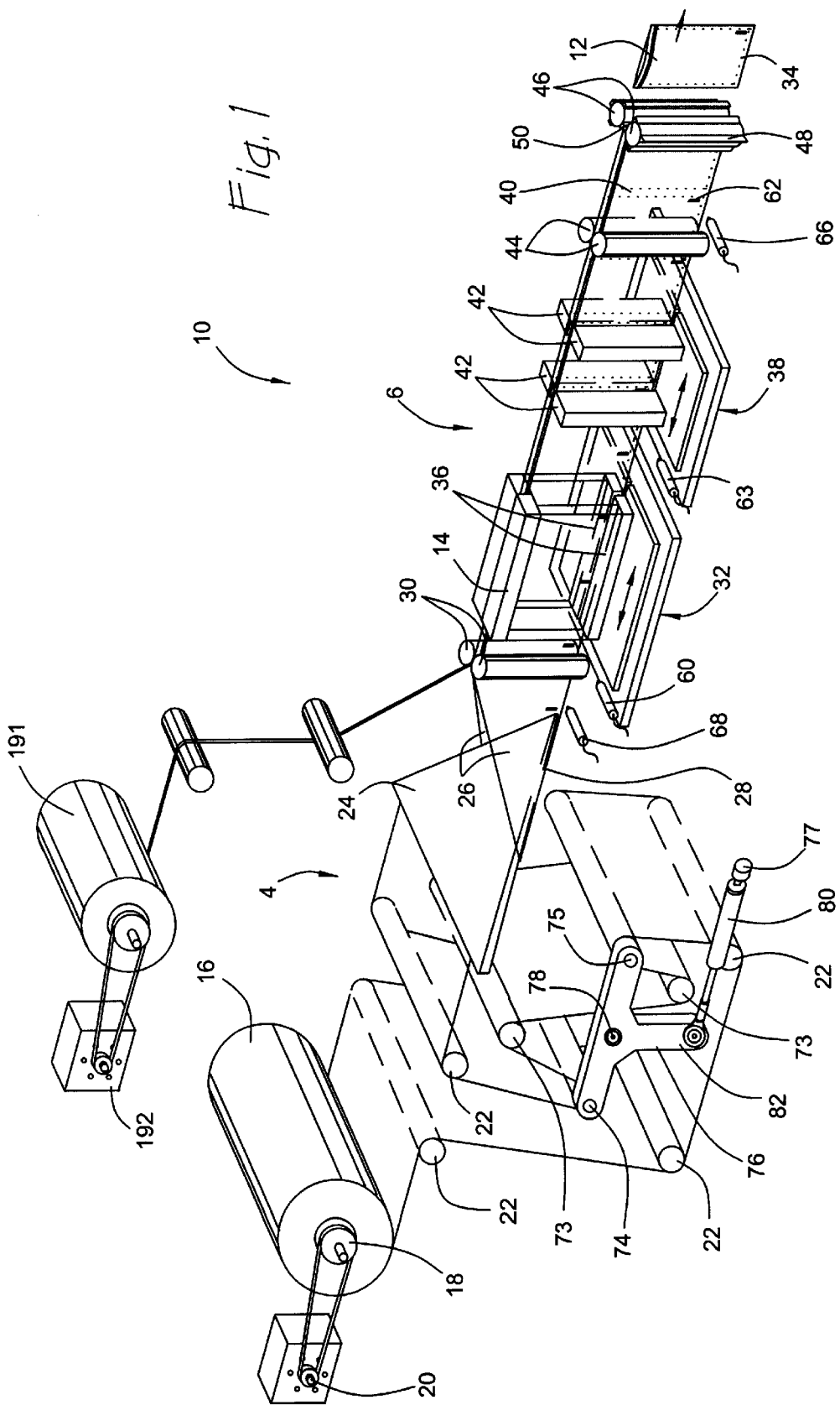
FIG. 1 is a schematic view in perspective of a packaging machine in accordance with the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, a packaging machine 10 is illustrated in FIG. 1. The packaging machine 10 produces pouches 12 from a continuous web 14 of material. The web 14 has pre-printed registration marks 62 at spaced intervals corresponding to the desired pouch width. The position of the registration marks is known with respect to the printed artwork. The web is made of sealable material, which includes heat-sealable material (such as polyethylene or polypropylene) and pressure-sensitive cold seal film. The embodiments described below are directed mainly to a machine 10 running heat-sealable web material.

According to the preferred embodiment illustrated in FIG. 1, the packaging machine has an infeed section 4 which supplies the folded web 14 to a sealing section 6. The planar web material is typically provided as a wound roll 16. The infeed section 4 has a reel 18 for supporting the roll 16. The reel 18 rotates to unwind the roll 16, thereby dispensing the web 14. The reel 18 may be conventionally controlled or, as described in greater detail below, may have a dedicated unwind motor 20 for varying an unwind speed. The web 14 is threaded over tension rollers 22 and a plow assembly 24 for folding the web to form side panels 26 joined at a common bottom edge 28. As illustrated in FIG. 1, the bottom edge 28 is formed with a V-shape. The plow assembly 24 may also include a gusset blade (not shown) for forming a W-shaped bottom edge. The folded web 10 is passed through a pair of infeed rolls 30 to cleanly define the fold lines in the web. In accordance with certain aspects of the present invention, the infeed rolls 30 may also pull the web through the first portion of the packaging machine, as described in greater detail below.

The web 14 next travels through a sealing portion of the machine 10 in which any of a number of pouch forming operations take place. In accordance with the embodiment illustrated in FIG. 1, the web 14 first passes through a bottom or first seal station 32 for forming a bottom seal 34, such as a delta seal, in the web 14. The web 14 next passes through a side seal station 38 which forms vertical side seals 40 in the web. Upon leaving the side seal station 38, the web 14 is formed as a strip of pouches interconnected at the side seals 40. The seal stations 32, 38 may use heated seal bars to form seals in heat-sealable web material, or may use unheated seal bars when the web material is a cold seal film. If heated, the seal bars have a heating element such as a heat tube extending therethrough. The heat tube is preferably electrically operated and controlled to provide a desired sealing temperature at the surface of the seal bar.

Figure 5B:
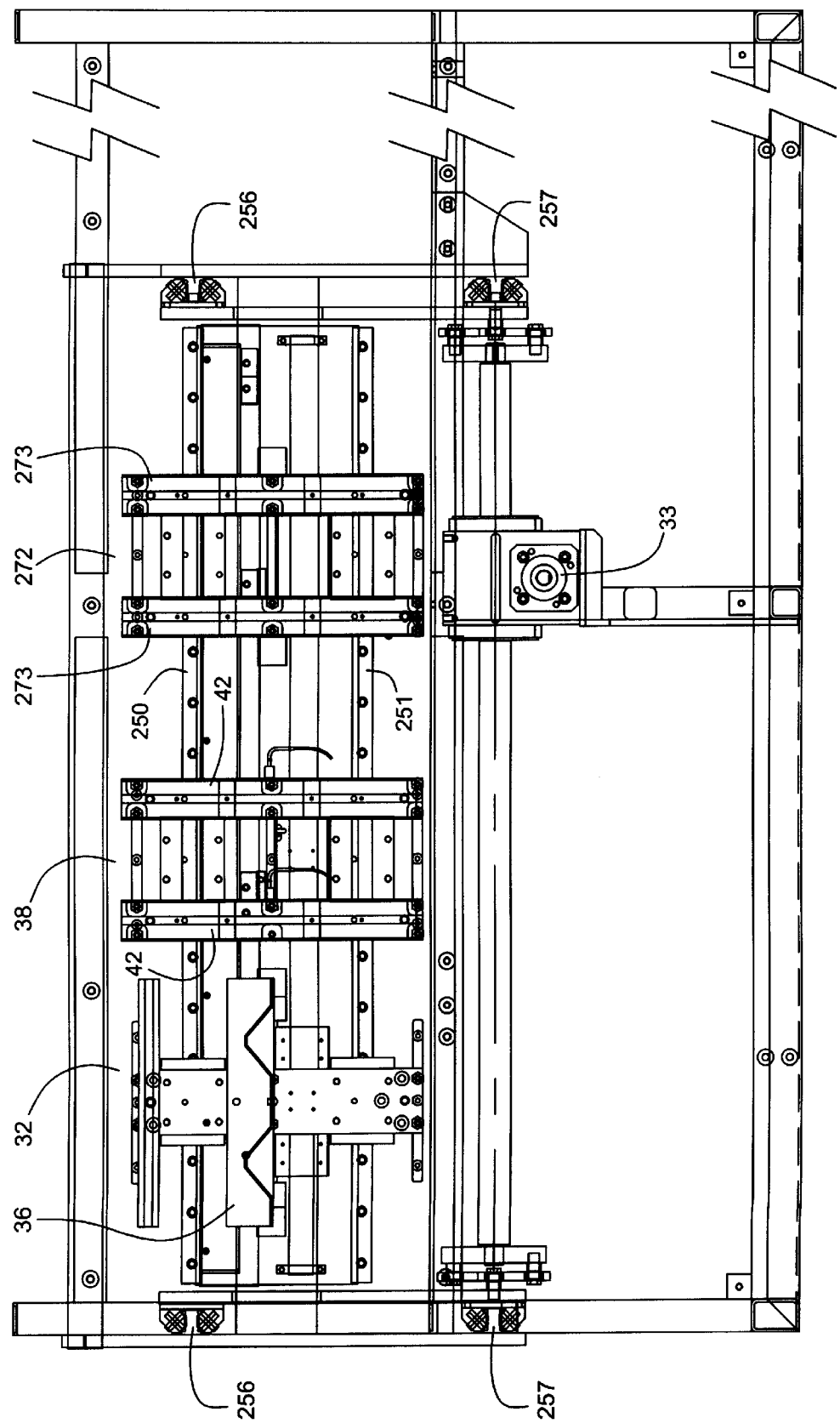
FIGS. 5A and B are enlarged top and side views of the currently preferred sealing section.

In accordance with certain aspects of the present invention, the seal stations 32, 38 are operable to form seals in the web 14 as the web advances. In the currently preferred embodiment illustrated in FIGS. 5A and B, the bottom seal station, for example, has a pair of opposing bottom seal bars 36. A sub-support 37 is attached to the rear of each bottom seal bar 36, and each sub-support 37, in turn, is attached to a carriage 56. Each carriage 56 is adapted, such as by bearing sets, to slide along upper and lower tracks 250, 251 which extend along the length of the sealing section, as best shown in FIG. 5B. The sliding carriages 56 allow the bottom seal bars to translate back and forth parallel to the web path, defined herein as longitudinal motion.

The bottom seal bars 36 are further operable in a direction perpendicular to the web path, defined herein as lateral motion. The tracks 250, 251 are attached to end supports slidably mounted on rails 256, 267 extending perpendicular to the web path (FIG. 5B). As a result, the upper and lower tracks 250, 251 are operable in the lateral direction to reciprocate the bottom seal bars 36 into and out of engagement with the web path.

The side seal station 38 has a structure similar to that of the bottom seal station 32. As best shown in FIG. 5A, the side seal station comprises two pairs of opposing seal bars 42. Sub-supports 43 are attached to the seal bars 42. The sub-supports 43, in turn, are attached to carriages 58 mounted for translation along the upper and lower tracks 250, 251. As a result, the side seal bars 42 are also operable in both the longitudinal and lateral directions.

The combination of the laterally and longitudinally translating carriages 56 allows the seal bars to be driven in a box motion. As best shown in FIG. 3A, the bottom seal bars 36 begin in an initial position, in which the bars are retracted from the web and the carriages 56 are at an upstream position. From the initial position, the carriages 56 are driven downstream at a same speed as the web, as shown in FIG. 3B. With the carriages 56 still moving downstream, the carriages 56 are driven laterally inwardly so that the seal bars 36 engage the web 14 (FIG. 3C). The bottom seal bars 36 are held in the inward position for a period of time sufficient to form a bottom seal as the carriages 56 continues to advance with the web 14 (FIG. 3D). After the bottom seal 34 is formed, the seal bars 36 are retracted and the carriages 56 reverse direction so that the web 14 advances downstream relative to the seal bars 36 (FIG. 3E). With the bottom seal bars 36 retracted, the carriages 56 moves longitudinally upstream toward the initial position (FIG. 3F). The bottom seal station 32 then repeats the above-described box motion to form subsequent bottom seals 34. The side seal station 38 is operated in a similar fashion.

In the above embodiment, the sealing stations 32, 38 operate in a duplex mode, in which the web 14 advances two pouch widths between each actuation of the seal bars. Accordingly, the bottom seal bars 36 are two pouch widths wide to simultaneously form two bottom seals 34. Similarly, the side seal station 38 carries two pairs of side seal bars 42. The machine 10 may also be operated in a simplex mode, whereby the web 14 is advanced a single pouch width between each actuation. In simplex mode, the bottom seal bars 36 are only one pouch width wide, and the side seal station 38 has a single pair of side seal bars 42.

In the preferred embodiment, variable speed motors are used to operate the bottom and side seal stations 32, 38 in the box motion. With respect to the bottom seal station 32, a variable speed motor 57 is coupled to each carriage 56 for driving the carriages longitudinally (FIGS. 5A and B). The motor 57 is preferably a linear motor having a magnetic rod 261 extending along the length of the sealing section 6. A motor housing 262 is mounted on the carriage 56 and operates back and forth along the rod 261. As a result, movement of the housing 262 along the rod 261 directly drives the attached carriage 56 longitudinally along the upper and lower tracks 250, 251. Similar motors 59 also drive the side seal carriages 58. The motors are preferably linear motors having housings 267 mounted on the same magnetic rods 261.

The lateral motion of the bottom and side seal bars 36, 42 is also preferably motor driven. A variable speed motor 33 is mechanically linked to the tracks 250, 251 to laterally reciprocate the tracks, thereby driving the seal bars 36, 42 into and out of engagement with the web 14 (FIG. 5B).

While the embodiment illustrated in FIGS. 5A and B is currently preferred, it will be appreciated that other arrangements may be used in accordance with the present invention, as long as the seal bars 36 are operable to translate in the longitudinal and lateral directions. For example, as schematically illustrated in FIG. 1, a single carriage mounted under the web may support seal bars on both sides of the web. Such an embodiment would require a second motor mounted on each carriage for driving the lateral motion of the seal bars.

The seal bars are operated to engage the web as the web advances for both continuous and intermittent web motion. It will be appreciated that for intermittent web motion, the machine 10 of the present invention could be operated so that the seal bars engage the web during dwells, as is conventional. In the currently preferred embodiment, however, the seal bars always contact the web as the web advances, regardless of whether the web is advancing continuously or intermittently. By operating the seal stations in this manner, the seal bars will always be in contact with the web for a sufficient period of time to form the seals regardless of the dwell time between each intermittent advance of the web. Furthermore, the machine operates in a similar fashion for both continuous and intermittent web motion, thereby simplifying the controls and providing a machine which operates in a consistent manner.

According to the embodiment illustrated in FIG. 5A, the sealing section further comprises a cooling station 272. The cooling station 272 has cooling bars 273 carried by sub-supports 274. Carriages 275 carry the sub-supports 274 and are mounted on the upper and lower tracks 250, 251. Accordingly, the cooling station 272 is operated in the box motion similar to the bottom and side seal bars 36, 42. The cooling bars, however, are kept at a cool temperature in contrast to the heated seal bars. The cooling bars 273 set the side seals in the web so that the side seals 40 are stronger and do not stretch as the web 14 is pulled through the machine 10. The sealing section may further include additional mechanisms for notching, punching, and emboss coding the web. These additional components are located downstream of the cooling station.

Furthermore, the first seal station 32 may also carry zipper seal bars 190 for sealing a zipper near the upper edge of the pouches 12 (FIG. 1). A separate roll of zipper material is supported on a zipper reel 191. The zipper reel 191 rotates to dispense the zipper material, which is directed between the side panels of the web 14 at the plow. The zipper seal bars 190 are attached to the carriages 56 which carry the bottom seal bars. Accordingly, the zipper seal bars 190 engage the web to seal the zipper to the pouch as the first seal station 32 operates. In the preferred embodiment variable speed motor 192 is drivingly connected to the zipper reel 191. The motor 192 is controlled to match downstream demand through the sealing section 6.

Figure 4:
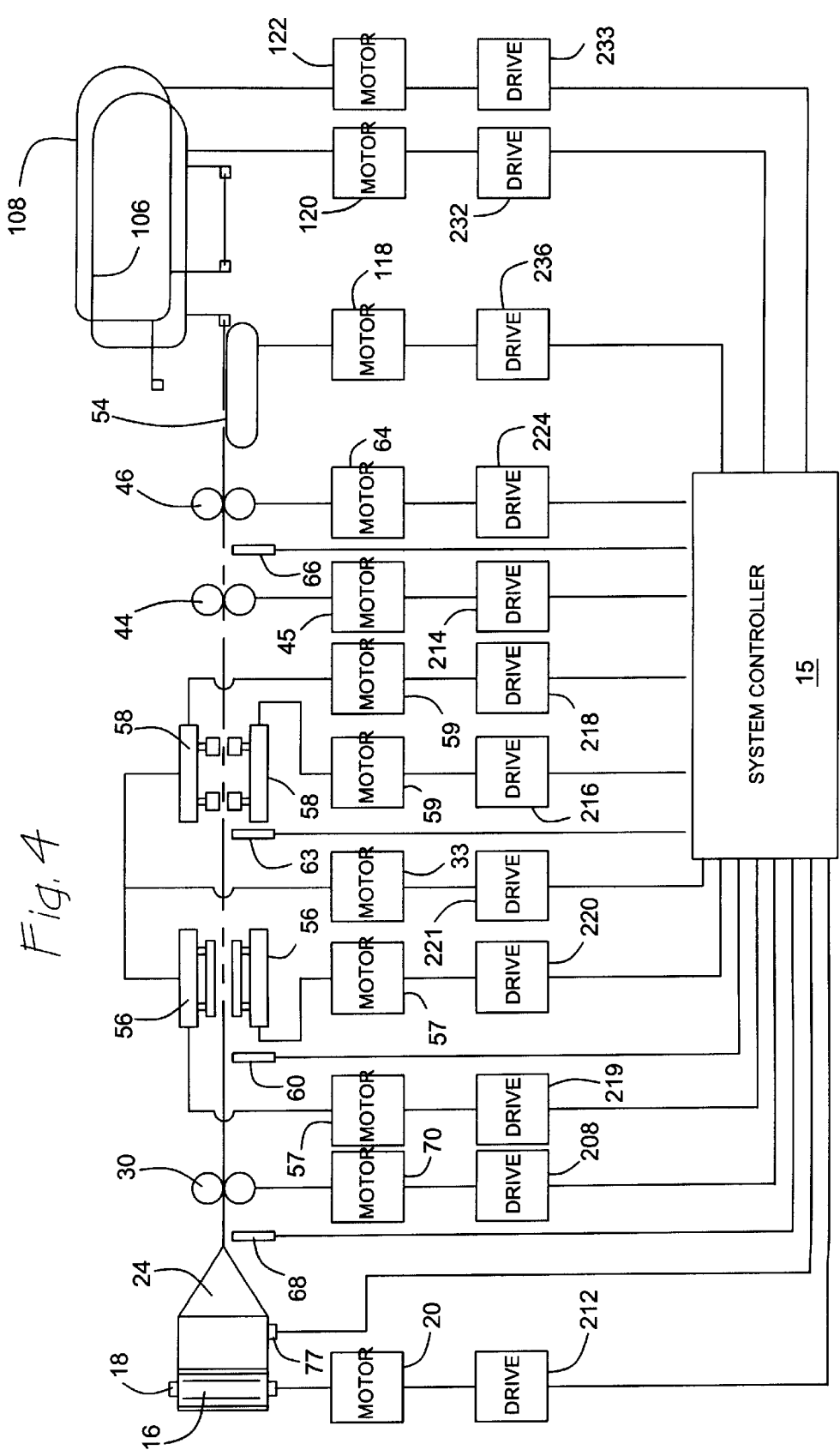
FIG. 4 is a block diagram illustrating the preferred controls for the machine of FIG. 1.

A pair of drive rolls 44 are located downstream of the seal stations to pull the web through the sealing section of the machine 10 (FIG. 1). The drive rolls 44 are positioned to pinch the web 14, thereby frictionally advancing the web. In accordance with certain aspects of the present invention, the drive rolls are operable both continuously and intermittently. In the preferred embodiment, a variable speed motor, such as drive roll servomotor 45, is connected to and operates the drive rolls (FIG. 4).

A cutter is positioned immediately downstream of the drive rolls 44 (FIG. 1). According to the present invention, the cutter is adapted to cut the web at the formed side seals as the web advances. In the currently preferred embodiment, the cutter comprises a pair of cutter rolls 46, a first roll having a plurality of circumferentially spaced blades 48 and a second roll having a plurality of similarly spaced cutting surfaces 50. The cutter rolls 46 are mounted for rotation so that a blade 48 contacts the web 14 at the same time as an associated cutting surface 50 to thereby sever a leading pouch 12 from the web. In the preferred embodiment, a variable speed motor 64 operates the cutter rolls 46 (FIG. 4). Each pouch severed by the cutter rolls 46 is then transferred to a pouch filling section 8 by a transfer mechanism 54, as described in greater detail below.

The above-described sealing and cutting mechanisms are triggered in response to signals provided by a system controller 15, in accordance with the present invention. The system controller 15 is programmed to adjust the dwell of the components to thereby adapt the machine 10 for different operating parameters. In the preferred embodiment, the machine 10 uses electronic line shafting to synchronize the motor-driven components. An oscillator generates a pulse stream and is connected to a microprocessor in the system controller 15. The pulse stream corresponds to the web speed such that a given web speed has a corresponding pulse rate. The pulse rate is adjusted proportionally to web speed. As a result, the distance the web advances between pulses is always constant, and components may be placed at locations downstream of a fixed point on the machine which correspond to certain pulse counts. Web speed is defined herein as the instantaneous rate of travel of the web 14 as it advances. Under this definition, web dwell time during intermittent motion is not used to compute the instantaneous web speed.

According to the illustrated embodiment, the machine 10 has an infeed sensor 68 located at a registration point for sensing the registration marks 62 and generating a sync signal as each registration mark passes. The sync signals inform the system that the web is positioned in the machine 10 with a registration mark 62 at the registration point. With a defined registration point, therefore, components may be positioned at known distances downstream of that point and controlled to actuate a determined number of pulses after the registration signal. For example, the first seal station 32 may be positioned 2 feet downstream of the registration point, which may correspond to 1,000 pulses. The system controller 15 may then trigger operation of the seal station after 1,000 pulses are counted from the sync signal. The pulse rate is generated such that, for this example, 1,000 pulses correspond to 2 feet of web travel for any web speed.

As noted above, a sync signal indicates that a registration mark 62 is passing the sensor 68. The registration marks 62 are longitudinally spaced at pouch width intervals along the web 14 so that consecutive sync signals indicate that the web has advanced one pouch width, defined herein as a cycle. In the most preferred embodiment, therefore, the web-engaging components are positioned downstream of the infeed at pouch width intervals. As a result, the components are controlled to operate with reference to each sync signal.

The pulse stream allows the machine 10 to be quickly and easily adapted to form pouches of various sizes. As noted above, the components of the machine may be positioned at pouch width intervals. If the pouch width is changed, the position of the components must also be adjusted for the new width. Using the example presented above, the first seal station 32 may be repositioned 1 foot downstream of the registration point rather than 2 feet. The microprocessor of the system controller 15 may be programmed so that, for the new position, the first seal station 32 is triggered after 500 pulses are counted from the sync signal thereby adjusting the dwell period of the first seal station. The motors 57, 59 of the carriages 56, 58 allow the first and second seal stations 32, 38 to be quickly and easily repositioned for the new pouch width. Furthermore, the system controls are programmed to modify the dwell periods between component operations. Accordingly, the pouch making machine 10 of the present invention is quickly and easily adapted for various pouch sizes.

The above-described box motion of the seal stations 32, 38 is also preferably timed using the pulse stream. Accordingly, the carriages 56 of the bottom seal station 32 are controllably positioned a known distance downstream of the infeed sensor 68. As diagrammatically illustrated in FIG. 4, the system controller 15 controls drives 219, 220 to generate a drive signal to the carriage motors 57 to move the carriages 56 downstream at a speed equal to the web speed after a predetermined pulse count. As the carriages 56 move, the system controller 15 signals the reciprocating motor 33 through drive 221 to actuate the bottom seal bars 36 laterally inward after a predetermined number of pulses have elapsed after each sync signal. The motor 33 holds the bottom seal bars 36 in the inward position for another predetermined number of pulses corresponding to a sufficient period of time to form a seal in the web. Once the seal is formed, the bottom seal bars are retracted and the carriages 56 are driven upstream to the initial position. The same procedure is followed after each sync signal. The side seal station is operated in the same fashion. While the use of a pulse stream is preferred, it will be appreciated that other types of controls may be used to actuate the seal stations, such as the use of optical sensors which provide a feedback signal to initiate actuation of the components.

In the preferred embodiment, the drive roll servomotor 45 is also controlled by the system controller 15 using the pulse stream. The user selects a desired web speed and a pulse rate corresponding to that web speed is generated. The system controller 15 delivers a drive signal through drive 214 to the drive roll motor 45 to operate the drive rolls at the appropriate speed (FIG. 4).

In the preferred embodiment, the seal stations 32, 38 are provided with automatic registration to the web 14. To accomplish registration, a sensor is coupled to the carriage motors of each seal station via the controller 15. The sensor senses the registration marks 62 and delivers a seal registration signal. The bottom seal station 32, for example, carries a bottom seal sensor 60, as shown in FIGS. 1 and 4. The controller 15 receives the signal and drives the carriage motors 57 to position the carriages 56 relative to the registration mark 62 so that the bottom seal bars 36 are positioned over appropriate seal points on the web. As a result, the bottom seal station 32 is continually and automatically registered with the web 14. Any carriage position adjustments required for registration are compensated for by the microprocessor in the system controller 15, so that the box motion is executed in registration with the web 14. The side seal station 38 has a side seal sensor 63 for effecting similar registration. As shown in FIG. 4, the carriage motors 59 have drives 216, 218 coupled to the system controller 15. The sensor 63 delivers a location signal to the controller 15 which, in turn, adjusts the drive signals sent to the motors 59.

In the preferred embodiment, the cutter rolls 46 are also controlled to register with the web 14. A cutter sensor 66 is mounted a fixed distance upstream of the cutter rolls 46 for sensing the registration marks 62 and delivering a cut signal. The system controller 15 signals a drive 224 in response to the cut signal to control the speed of the cutter motor 64 so that the cutting rolls 46 cut through each side seal 40 (FIG. 4). Because the distance between the cutter sensor 66 and the cutter rolls 46 is known, the cutter servomotor 64 may be programmed to dwell for a given number of pulses upon receiving the cut signal before actuating the cutter rolls 46. Furthermore, it is easy to adjust the dwell to correspond to a different pulse count, to thereby adapt the cutter for both continuous and intermittent web motion.

In a preferred embodiment, the infeed rolls 30 are controlled to provide a registered web to the sealing section. The infeed rolls 30 are driven by a variable speed motor 70, such as a servomotor. The infeed sensor 68 is located immediately upstream of the infeed rolls 30 and senses the registration marks 62, as noted above. The system controller 15 compares the sync signals from the infeed sensor 68 with the desired web speed and adjusts a drive signal provided by drive 208 to the infeed motor 70 (FIG. 4). In intermittent mode, the infeed motor 70 is controlled so that the web 14 is advanced past the infeed rolls 30 by a predetermined distance. In continuous mode, the infeed rolls 30 are controlled so that the actual web speed, as measured by the infeed registration signals, matches the desired web speed. In either mode, operation of the infeed rolls is adjusted so that a registered web is supplied to the sealing section.

The infeed rolls 30 provide a second point at which the web 14 is pulled through the machine 10. The infeed rolls 30 engage the web 14 at a point upstream of the sealing section 6 to pull the web through the infeed section. As a result, the amount of web stretch through the sealing section is minimized, thereby improving the accuracy of the machine.

In the preferred embodiment, the unwind reel 18 is power-driven to reduce tension spikes in the web 14. The reel motor 20 has a drive 212 coupled to the system controller 15. As a result, the controller adjusts reel motor speed according to downstream demand. For example, in intermittent mode, the web 14 is advanced through the seal section 6 at an average speed in between pauses. The reel 18 is controlled to operate at an average speed which matches that of the seal section 6. The roll 16 is relatively heavy, and therefore has too much inertia to stop and start the roll in accordance with the web. The system controller 15 therefore drives the reel motor 20 in a controlled cycle in which the reel motor speed is increased and decreased for each intermittent increment of web travel. In continuous mode, the reel motor 20 is driven at a more consistent speed. In either mode, the reel motor 20 unwinds the roll 16 to thereby reduce tension in the web.

An accumulator 76 is provided for storing a buffer length of web material. As shown in FIG. 1, the accumulator 76 is preferably located between the plow 24 and the reel 18. The accumulator has translating rolls 74, 75 and is fixed to pivot about a point 78. Fixed rolls 73 are also positioned near the accumulator 76. When the web 14 is threaded through the accumulator 76, it will be appreciated that the accumulator stores a buffer length of web material. Depending on downstream demand, the accumulator may pivot clockwise or counter-clockwise about point 78. When rotating counter-clockwise, the accumulator 76 stores additional web material. When the accumulator 76 rotates clockwise, web material is played out from the buffer. Accordingly, it will be appreciated that the accumulator 76 provides a festoon for storing the buffer length of web.

In a preferred embodiment, the position of the accumulator 76 is used to indicate downstream web demand and to adjust the reel motor 20 speed accordingly. As shown in FIG. 1, an air cylinder 80 is connected to a bottom arm 82 of the accumulator 76. Rotation of the accumulator 76 extends or retracts the air cylinder 80. A sensor 77 is coupled to the air cylinder 80 to measure the position of the air cylinder and generate a position signal to the controller 15. In response to this signal, the controller 15 increases or decreases the speed of the reel motor 20 to bring the reel unwind speed in line with downstream web demand.

In accordance with additional aspects of the present invention, the above-described reel control minimizes the amount of festoon area needed in the infeed section 4. The reel motor 20 is controlled to adjust speed according to downstream demand. As a result, the amount of spare web material needed to be stored in a festoon is minimized. The reduced festoon, in turn, reduces the amount of floor space needed for the machine.

Figure 2:
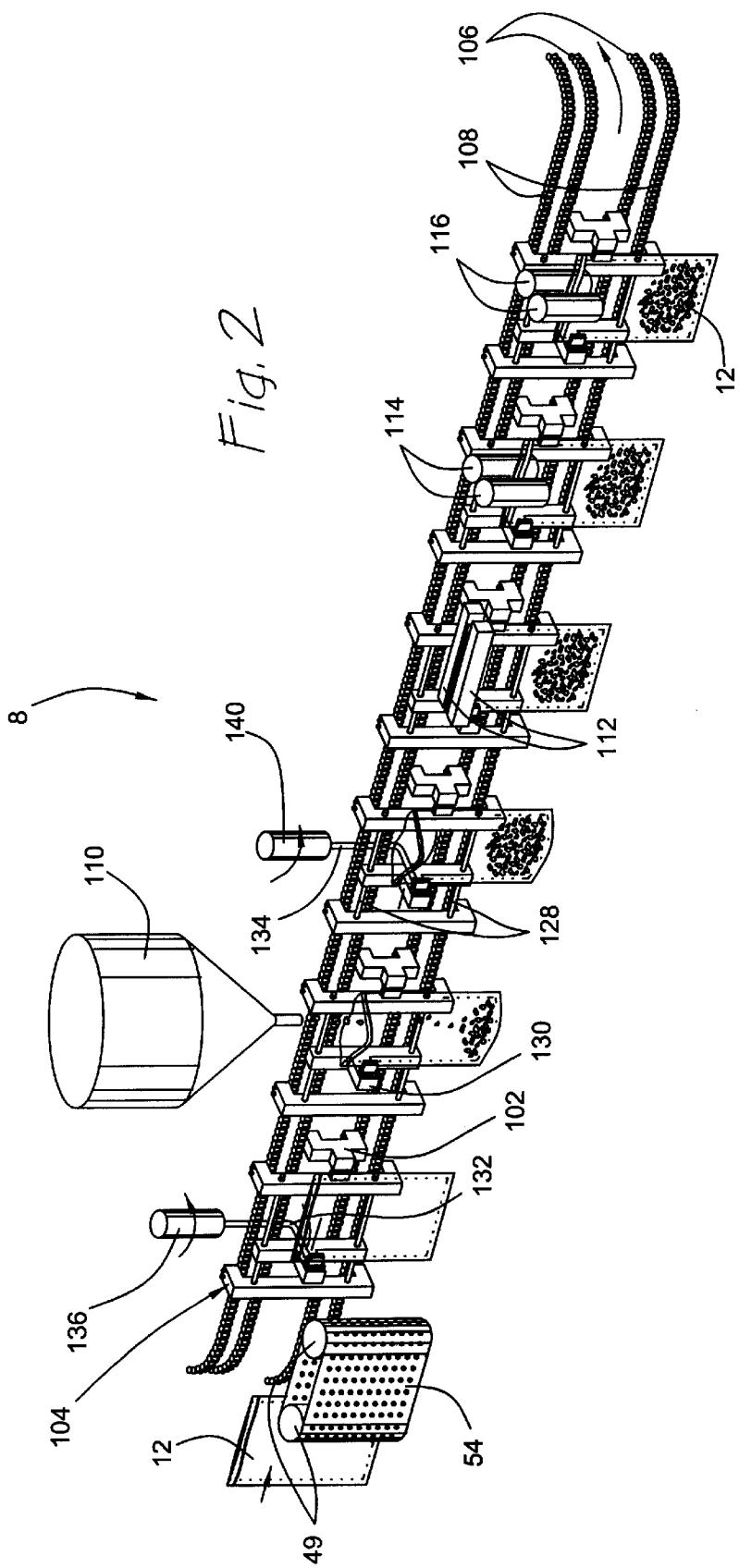
FIG. 2 is an enlarged perspective view of a pouch filler section for use with the packaging machine of FIG. 1.

The machine 10 incorporates a pouch filling section 8 for filling and sealing the formed pouches. At the outlet of the sealing section, the transfer mechanism 54 carries severed pouches from the cutter rolls 46 to leading and trailing clamps 102, 104 of the filler section. The clamps are carried on first and second endless carriers, illustrated in FIG. 2 as first and second chain sets 106, 108. It will be appreciated that other types of endless carriers, such as timing belts or metal bands, may also be used in accordance with the present invention. Furthermore, each endless carrier may comprise a single member, or a set of multiple members, FIG. 2 illustrating the latter by showing first and second chain sets 106, 108 comprising a pair of chains. The clamps are carried along a path which leads through a pouch filler 110. Once filled, the top edges of the pouches pass through radiant heater bars 112 which soften the pouch material. The pouches 12 with softened upper edges are then fed through a pair of upper seal rolls 114 to form an upper seal. The pouches then pass through a pair of cool rolls 116 to set the upper seal, after which each pouch 12 is picked off and transported from the filler section.

In the preferred embodiment, a variable speed motor 118 operates the transfer mechanism 54 to transfer each severed pouch 12 from the cutter rolls 46 to the clamps 102, 104 (FIG. 4). The transfer motor 118 has an associated drive 236 for providing a variable drive signal and is coupled to the system controller 15. It will be appreciated that, because of spacing between the clamps, the clamps are operated at a clamp speed greater than the web speed. The transfer mechanism 54, accordingly, is driven at a transfer speed which is slightly greater than the clamp speed. When first gripping a pouch, the transfer mechanism slides against the surface of the pouch until the pouch is severed from the web. Similarly, the transfer mechanism slides against the pouch until the pouch is carried away.

In the preferred embodiment, the transfer mechanism 54 provides a registration buffer between the sealing and pouch filling sections. The transfer speed of the transfer mechanism 54 may be independently controlled so that the components of the sealing section need not operate in registration with the clamps 102, 104 of the pouch filling section. As a result, the sealing and pouch filling section may be independently registered with the web and pouches, respectively. Registration between the components of the sealing and pouch filling sections is not required, and therefore the entire machine 10 may be brought into registration with the web 14 more quickly and with minimal wasted web material.

In accordance with certain aspects of the present invention, the endless carriers are operable both continuously and intermittently. In the preferred embodiment, variable speed leading and trailing carrier motors 120, 122 operate the leading and trailing chain sets 106, 108 (FIG. 4). A drive 232 provides a variable signal to the leading carrier motor 120 and is coupled to the system controller 15 (FIG. 4). The trailing carrier motor also has a drive 233 and is similarly controlled. The leading and trailing chain servos 120, 122 operate the leading and trailing chain sets 106, 108 with a phase distance between the two so that the leading and trailing clamps 102, 104 are separated by about a pouch width. The leading and trailing chain servos 120, 122 allow the phase distance to be adjusted to accommodate different size pouches. It will be appreciated that whatever the phase distance, the chains are operated at the same speed so that bags held in the clamps are not stretched or crushed.

In the embodiment illustrated in FIG. 2, the trailing clamp 104 is moveable to allow the top of the pouch to be opened and closed. The trailing clamp 104 comprises supports 126 which are connected to the trailing chain set 108. A pair of support arms 128 are attached to the supports. A clamp holder 130 is slideably mounted on the support arms 128 for movement between closed and open pouch positions. In the closed pouch position, as best shown by the left-hand pouch illustrated in FIG. 2, the clamp holder 130 is positioned near the upstream extent of the support arms 128. The clamp holder 130 is slidable on the support arms 128 to an open pouch position as best shown by the trailing clamp 104 located below the filler 110 in FIG. 2. In the open pouch position, the clamp holder 130 is positioned midway along the support arms 128 so that the clamp holder 130 is relatively closer to the leading clamp 102. It will be appreciated that in a pouch 12 held by clamps in the open position, the side walls of the pouch 12 expand outwardly away from one another to allow access to the interior of the pouch.

In operation, the clamps 102, 104 are in the closed position as the pouches 12 are transferred from the sealing section. Before the pouch reaches the pouch filler 110, the clamp holder 130 is moved to the open position to facilitate filling of the pouch. The clamp holder 130 remains in the open position as the clamps pass through the pouch filler and the pouches are filled with product. After exiting the pouch filler 110, the clamp holder 130 is repositioned back toward the closed position to allow the top edge to be sealed.

The clamp holder 130 is repositioned using servo-controlled upstream and downstream mechanisms. As best shown in FIG. 2, the upstream pouch-opening mechanism comprises an advance arm 132 positioned before the pouch filler 110. The advance arm 132 has an initial position in which the arm is located outside of the web path. As the clamp holder 130 passes, the advance arm 132 rotates to engage a rear face of the clamp holder 130 and slide it toward the open pouch position. The advance arm 132 completes a full revolution to return to the initial position. If the upstream mechanism has dual arms, the arms complete a half revolution. The advance arm 132 is driven by a motor 136 phased with the system controller 15 so that the advance arm rotates during each cycle.

The downstream pouch closing mechanism preferably comprises a retard arm 134 controlled similar to the advance arm 132. The retard arm 134 extends into the path of the passing clamp holder 130 to impede further advancement of the clamp holder 130. Once the clamp holder 130 reaches the closed position, the retard arm 134 is rotated out of the path to allow the clamp holder 130 to pass. The retard arm 134 executes a full revolution to return to the initial position to await the next clamp holder 130. Rotation of the retard arm 134 is controlled by a retard servomotor 140. The retard servomotor 140 is controlled by the system controller 15 so that operation of the retard arm 134 is phased with the system. Accordingly, the retard servomotor 140 is actuated so that it dwells for a portion of each cycle before rotating.

During the dwell, the retard arm 134 engages and pushes the clamp holder 130 toward the open pouch position. The downstream mechanism may have two arms spaced by 180 degrees. For such an embodiment, the arms rotate one-half revolution during each cycle.

As noted above, the filled and closed pouches 12 are then passed between radiant heater bars 112 and top seal rolls 114 to seal the upper edge of the pouches. The pouches may further pass through cool rolls 116 to set the upper seal before being discharged. The top seal rolls 114 and cool rolls 116 are driven by variable speed motors connected to the system controller 15.

In accordance with certain aspects of the present invention, the top seal rolls 114 also reclose the zipper, when provided. If a zipper is sealed to the pouches in the manner previously noted, that zipper will be opened during the pouch opening operation so that the pouch 12 may be filled. As the pouch is sealed, it is preferable to reclose the zipper so that it does not subsequently become contaminated with product. Accordingly, the top seal rolls 114 are sized to engage and reclose the zipper as the pouch passes between the rolls (FIG. 2).

In light of the above, it will be appreciated that the present invention provides a new and improved packaging machine for forming pouches from a web of material. The machine is operable in both continuous and intermittent modes. A drive roll is motor-driven to advance the web either continuously or intermittently. Web-engaging components, such as seal mechanisms and cutters, are operated to perform their associated functions as the web advances. The web-engaging components are further selectively operable to have an adjustable dwell period between subsequent operations thereby allowing the machine to be switched between continuous and intermittent modes and to allow the machine to form pouches of various widths. The pouches are transferred to a pouch filling section capable of receiving and advancing the individual pouches either continuously or intermittently.

What is claimed is:

1. A pouch machine for forming pouches from a web of sealable material folded to have mating first and second sides, the web advancing along a web path, the machine comprising:

a pair of drive rolls positioned to engage opposite sides of the web and to draw the web through the apparatus, a variable speed motor drivingly connected to the drive rolls and selectively operable in a continuous and intermittent mode, the continuous mode drawing the web in a continuous manner, and the intermittent mode drawing the web in stepped increments related to pouch width;

a sealer having at least one pair of opposed seal bars positioned on opposite sides of the web path, each seal bar mounted for translation in a direction parallel to the web path, a variable speed motor drivingly connected and selectively operable to translate each seal bar in the parallel direction in timed synchronism with the web passing between the seal bars, the seal bars also being mounted for translation in a direction perpendicular to the web path, a variable speed motor drivingly connected and selectively operable to actuate the seal bars in the perpendicular direction to engage or disengage the web in timed synchronism with web travel; and a cutter having opposed cutting surfaces disposed on opposite sides of the web path, a variable speed motor drivingly connected to the cutter and selectively operable to cut the web in registration with seals formed by the sealer.

2. The pouch machine of claim 1 further comprising a pouch filling station having a plurality of clamps adapted to receive individual pouches from the cutter, the clamps mounted on an endless carrier, a variable speed motor drivingly connected to the endless carrier and selectively operable in a continuous or intermittent mode, and a transfer mechanism extending between the cutter and the clamps, a variable speed motor drivingly connected to the transfer mechanism and selectively operable in a continuous or intermittent mode.

3. The pouch machine of claim 2 in which the pouch filling station further comprises pouch opening and closing mechanisms located upstream and downstream of a pouch filler, respectively, variable speed motors drivingly connected to the pouch opening and closing mechanisms and selectively operable in timed sequence in a continuous or intermittent mode.

4. The pouch machine of claim 2 in which the pouch filling station further comprises a pair of top seal rolls positioned to engage an upper portion of the pouches, a variable speed motor drivingly connected to the top seal rolls and selectively operable in timed sequence in a continuous or intermittent mode.

5. The pouch machine of claim 1 in which each sealer includes a support which comprises a carriage slidably mounted on a track extending parallel to the web path.

6. The pouch machine of claim 5 in which the web has registration marks printed thereon, and wherein the sealer further comprises a sensor for sensing the registration marks and delivering location signals, the sealer motors responsive to the location signals to thereby adjust positions of the seal bars.

7. The pouch machine of claim 6 further comprising a sensor connected to the cutter motor for sensing the registration marks and delivering cut signals, the cutter motor responsive to the cut signals to actuate the cutter.

8. The pouch machine of claim 1 in which the sealable material is supplied as a roll, and wherein the machine further comprises a reel for supporting the roll, the reel rotatable to unwind the roll, thereby dispensing the web, a plow for folding the web into the mating first and second sides, and a festoon located between the reel and plow for storing a buffer length of web material.

9. The pouch machine of claim 8 further comprising a variable speed motor drivingly connected to the reel, and a mechanism for measuring downstream web demand, the measuring mechanism delivering a demand signal, the reel motor responsive to the demand signal to adjust reel speed.

10. The pouch machine of claim 1 in which each said seal bar is mounted on a support which is slidably mounted on a pair of rails extending perpendicular to the web path.

11. The pouch machine of claim 1 further comprising a zipper reel adapted to support and unwind a roll of zipper material, a roller positioned upstream of the sealer and adapted to feed the zipper material along a top edge of the folded web, a variable speed motor drivingly connected to the zipper reel and selectively operable in a continuous or intermittent mode to apply zipper strips to the pouches advancing continuously or intermittently.

12. A machine for forming pouches from a web of sealable material folded to have mating first and second sides, the machine comprising:

a pair of drive rolls positioned to engage opposite sides of the web, a variable speed motor drivingly connected to the drive rolls;

a sealer having a pair of opposed seal bars positioned on opposite sides of the web, each seal bar slidably mounted on a track extending parallel to the web, a variable speed motor drivingly connected to each seal bar for translation alone said track, the seal bars being mounted for reciprocation into and out of contact with the web, a variable speed motor drivingly connected to reciprocate the seal bars;

a rotary cutter having a pair of cutter rolls positioned on opposite sides of the web, a variable speed motor drivingly connected to the cutter rolls;

a pouch filling station adapted to receive individual pouches from the cutter, a variable speed motor controlling the advance of the received pouches;

a controller connected to and controllably operating the drive roll, carrier, and transfer motors and selectively operable in a continuous or intermittent mode, the controller adapted to coordinate the speeds of the drive roll and carrier motors, the controller also connected to the seal bar translation and reciprocation motors, the controller triggering the seal bar translation motors to drive the seal bars longitudinally downstream before triggering the seal bar reciprocation motor so that the seal bars engage the web as the web advances, the controller further connected to the cutter roll motor, the controller triggering the cutter roll motor to rotate the cutter rolls as the web advances.

13. The pouch machine of claim 12 in which the web has registration marks printed thereon, and wherein the sealer further comprises a sensor for sensing the registration marks and delivering location signals, the controller responsive to the location signals and driving the translation motors to thereby adjust positions of the supports.

14. The pouch machine of claim 13 further comprising a sensor connected to the cutter motor for sensing the registration marks and delivering cut signals, the controller responsive to the cut signals to drive the cutter motor, thereby actuating the cutter.

15. The pouch machine of claim 12 in which the sealable material is supplied as a roll, and wherein the machine further comprises a reel for supporting the roll, the reel rotatable to unwind the roll, thereby dispensing the web, a plow for folding the web into the mating first and second sides, and a festoon located between the reel and plow for storing a buffer length of web material.

16. The pouch machine of claim 15 further comprising a variable speed motor drivingly connected to the reel, and a mechanism for measuring downstream web demand, the measuring mechanism delivering a demand signal, the controller responsive to the demand signal to adjust reel motor speed.

* * * * *